United States Patent
Lim et al.

(10) Patent No.: US 8,743,111 B2
(45) Date of Patent: Jun. 3, 2014

(54) STEREOSCOPIC IMAGE DISPLAY AND METHOD FOR DRIVING THE SAME

(75) Inventors: Kyoungho Lim, Gyeonggi-do (KR); Hyungki Hong, Seoul (KR)

(73) Assignee: LG Display Co., Ltd., Seoul (DE)

( * ) Notice: Subject to any disclaimer, the term of this patent is extended or adjusted under 35 U.S.C. 154(b) by 331 days.

(21) Appl. No.: 13/195,321

(22) Filed: Aug. 1, 2011

(65) Prior Publication Data

US 2012/0032949 A1 Feb. 9, 2012

(30) Foreign Application Priority Data

Aug. 6, 2010 (KR) .......................... 10-2010-0075918

(51) Int. Cl.
*G06T 15/00* (2011.01)
*G09G 5/02* (2006.01)

(52) U.S. Cl.
USPC .......................................... 345/419; 345/695

(58) Field of Classification Search
USPC ........................................................ 345/419
See application file for complete search history.

(56) References Cited

U.S. PATENT DOCUMENTS

| 8,174,645 B2* | 5/2012 | Kim et al. ........................ 349/96 |
| 2006/0012593 A1* | 1/2006 | Iriguchi et al. ................ 345/204 |
| 2007/0024603 A1* | 2/2007 | Li .................................. 345/204 |
| 2010/0225682 A1* | 9/2010 | Nakahata ..................... 345/695 |
| 2010/0265230 A1 | 10/2010 | Kang |

FOREIGN PATENT DOCUMENTS

JP 2002-185983 6/2002
KR 10-2010-0115036 10/2010

* cited by examiner

*Primary Examiner* — Sath V Perungavoor
*Assistant Examiner* — Howard D Brown, Jr.
(74) *Attorney, Agent, or Firm* — Morgan, Lewis & Bockius LLP

(57) ABSTRACT

A stereoscopic image display includes a display panel, an active black stripe controller, which analyzes an information of a 3D depth between left eye image data and right eye image data, obtains a 3D depth value, compares the 3D depth value with a predetermined threshold value, and assigns data copied from the left eye image data and the right eye image data as data to be written to second division subpixels of pixels of the display panel when the 3D depth value is equal to or less than the predetermined threshold value, a data driving circuit which converts digital data received from the active black stripe controller into a data voltage and supplies the data voltage to data lines of the display panel, and a gate driving circuit sequentially supplying a gate pulse to gate lines of the display panel.

9 Claims, 14 Drawing Sheets

STEREOSCOPIC IMAGE DISPLAY AND METHOD FOR DRIVING THE SAME

This application claims the benefit of Korean Patent Application No. 10-2010-0075918 filed on Aug. 6, 2010, the entire contents of which is incorporated herein by reference for all purposes as if fully set forth herein.

BACKGROUND OF THE INVENTION

1. Field of the Invention

Embodiments of the invention relate to a stereoscopic image display and a method for driving the same capable of implementing a two-dimensional plane image (hereinafter referred to as "2D image") and a three-dimensional stereoscopic image (hereinafter referred to as "3D image").

2. Discussion of the Related Art

A stereoscopic image display implements a 3D image using a stereoscopic technique or an autostereoscopic technique.

The stereoscopic technique, which uses a parallax image between user's left and right eyes with a high stereoscopic effect, may include a glasses type method and a non-glasses type method. In the glasses type method, the parallax image between the left and right eyes is displayed on a direct-view display or a projector through a change in a polarization direction of the left and right parallax image or in a time-division manner, and thus a stereoscopic image is implemented using polarization glasses or liquid crystal shutter glasses. In the non-glasses type method, an optical part such as a parallax barrier and a lenticular lens for separating an optical axis of the left and right parallax image is generally installed in front of or behind a display screen, and thus the stereoscopic image is implemented.

FIG. 1 illustrates a related art glasses type stereoscopic image display. As shown in FIG. 1, the glasses type stereoscopic image display implements a stereoscopic image using polarization characteristic of a patterned retarder 5 disposed on a display panel 3 and polarization characteristic of polarization glasses 6 the user wears. The display panel 3 separately assigns a left eye image L and a right eye image R to adjacent display lines and displays the left and right images L and R. The patterned retarder 5 varies polarization characteristic of the left eye image L and polarization characteristic of the right eye image R differently from each other and separates polarizations of the left eye image L and the right eye image R. A left eye lens of the polarization glasses 6 transmits the polarization of the left eye image L and intercepts the polarization of the right eye image R. A right eye lens of the polarization glasses 6 transmits the polarization of the right eye image R and intercepts the polarization of the left eye image L. In FIG. 1, a reference numeral 1 denotes a backlight unit providing light to the display panel 3, and reference numerals 2 and 4 denote polarizing films respectively attached to an upper substrate and a lower substrate of the display panel 3.

In the glasses type stereoscopic image display shown in FIG. 1, visibility of a 3D image is reduced due to a crosstalk generated at a position of a vertical viewing angle. The user's left eye has to transmit only light of the left eye image L and the user's right eye has to transmit only light of the right eye image R, so as to prevent the crosstalk of the 3D image. However, when both light of the left eye image and light of the right eye image are incident on each of the user's left and right eyes, the user simultaneously sees the light of the left eye image and the light of the right eye image through the user's left or right eye. Namely, the user feels a left/right eye crosstalk. When the users does not watch the 3D image in the front of the display panel 3 and looks down or up the 3D image, each of a left eye patterned retarder 5a and a right eye patterned retarder 5b transmits both the light of the left eye image and the light of the right eye image at a vertical viewing angle, which is greater than a front viewing angle by an angle equal to or greater than a predetermined angle. This may lead to the crosstalk. Thus, the related art glasses type stereoscopic image display shown in FIG. 1 has the very narrow vertical viewing angle at which the 3D image can be displayed without generating the crosstalk.

Thus, as shown in FIG. 2, Japanese Laid Open Publication No. 2002-185983 discloses a method for widening a vertical viewing angle of a stereoscopic image display by forming black stripes BS on a patterned retarder 5. When the user observes the stereoscopic image display at a location spaced apart from the stereoscopic image display by a predetermined distance D, a vertical viewing angle $\alpha$, at which the crosstalk is not theoretically generated, depends on the size of black matrixes BM of a display panel 3, the size of the black stripes BS of the patterned retarder 5, and a distance S between the display panel 3 and the patterned retarder 5. The vertical viewing angle $\alpha$ widens as the size of the black matrixes BM and the size of the black stripes BS increase and as the distance S between the display panel 3 and the patterned retarder 5 decreases.

The stereoscopic image display shown in FIG. 2 having the black stripes BS on the patterned retarder 5 has the following problems.

First, the black stripes BS on the patterned retarder 5 contribute to an increase in the vertical viewing angle of the stereoscopic image display, but interact the black matrixes BM of the display panel 3 to thereby generate Moire. In this instance, when the stereoscopic image display displays a 2D image, visibility of the 2D image is greatly reduced because of the Moire. Second, a luminance of the 2D image displayed on the stereoscopic image display is greatly reduced because of the black stripes BS of the patterned retarder 5. This is because some of pixels of the display panel 3 are covered by the black stripes BS of the patterned retarder 5.

To solve the problems of the stereoscopic image display disclosed in Japanese Laid Open Publication No. 2002-185983, the present applicant has proposed a stereoscopic image display for dividing each of pixels of a display panel into two parts and using one of the two parts as an active black stripe in U.S. application Ser. No. 12/536,031 (Aug. 5, 2009) which is hereby incorporated by reference in their entirety. The stereoscopic image display disclosed in U.S. application Ser. No. 12/536,031 may prevent a reduction in a luminance of a 2D image by dividing each of the pixels into the two parts and writing 2D image data to each of the divided pixels in a 2D mode. Further, it may improve the visibility of both the 2D and 3D images by widening a vertical viewing angle in a 3D mode. Hence, it may provide more excellent display quality than the existing stereoscopic image display.

The user does not feel a stereoscopic feeling about a portion of data in the related art stereoscopic image display and may feel a noise called an artifact. This may be described by a binocular fusion phenomenon and a binocular rivalry phenomenon. As shown in FIG. 3, the binocular fusion phenomenon is that when visual informations, which are similar to as each other, are incident on each of the user's left and right eyes, a left eye image and a right eye image are fused with each other in the user's brain to generate one independent information fused in the user's brain. Thus, the user may perceive a stereoscopic image with a sufficiently stereoscopic feeling by the binocular fusion phenomenon. On the other hand, as shown in FIG. 4, the binocular rivalry phenomenon is that when different visual informations are incident on each of the user's left and right eyes, the different visual informations are competitively transferred to the user's brain to cause the artifact. If a non-stereoscopic image is divided into a left eye image and a right eye image and is displayed on the stereoscopic image display shown in FIG. 1 using a spatial division method, the user may perceive the artifact, which is completely different from an original image, from the stereoscopic image display shown in FIG. 1 due to the binocular rivalry phenomenon. The non-stereoscopic image is a non-stereoscopic image which has a high spatial frequency and has little a 3D depth between a left eye image and a right eye image of the non-stereoscopic image. As an example of the non-stereoscopic image, as shown in FIG. 12, there is a text image represented in a small space. If the text image shown in FIG. 12 is divided into a left eye image and a right eye image and is displayed on the stereoscopic image display shown in FIG. 1, the binocular rivalry phenomenon is caused because the left eye image and the right eye image are completely different from each other.

SUMMARY OF THE INVENTION

Embodiments of the invention provide a stereoscopic image display and a method for driving the same capable of increasing the display quality of a non-stereoscopic image having a high spatial frequency.

In one aspect, there is a stereoscopic image display comprising a display panel including data lines, gate lines crossing the data lines, thin film transistors (TFTs) respectively formed at crossings of the data lines and the gate lines, and pixels, each of which is divided into first and second division subpixels, an active black stripe controller configured to analyze an information of a 3D depth between left eye image data and right eye image data, obtain a 3D depth value, compare the 3D depth value with a predetermined threshold value, and assign data copied from the left eye image data and the right eye image data as data to be written to the second division subpixels when the 3D depth value is equal to or less than the predetermined threshold value, a data driving circuit configured to convert digital data received from the active black stripe controller into a data voltage and supply the data voltage to the data lines, and a gate driving circuit configured to sequentially supply a gate pulse to the gate lines.

When the 3D depth value is greater than the predetermined threshold value, the active black stripe controller assigns digital data of a black gray level as data to be written to the second division subpixels.

The stereoscopic image display further comprises a timing controller configured to control an operation timing of the data driving circuit and an operation timing of the gate driving circuit and transfer the digital data received from the active black stripe controller to the data driving circuit.

The active black stripe controller is built in the timing controller.

The display panel is a display panel of one of a liquid crystal display (LCD), a field emission display (FED), a plasma display panel (PDP), an electroluminescence device (EL) including an inorganic electroluminescence element and an organic light emitting diode (OLED) element, and an electrophoretic display (EPD).

The stereoscopic image display further comprises a patterned retarder positioned opposite a screen of the display panel, the patterned retarder converting a polarization characteristic of light incident from the screen of the display panel, and polarization glasses including a left eye polarizing filter and a right eye polarizing filter each having a different polarization characteristic.

In another aspect, there is a method for driving a stereoscopic image display comprising analyzing an information of a 3D depth between left eye image data and right eye image data to obtain a 3D depth value, comparing the 3D depth value with a predetermined threshold value and assigning data copied from the left eye image data and the right eye image data as data to be written to second division subpixels of pixels when the 3D depth value is equal to or less than the predetermined threshold value, converting the left eye image data, the right eye image, and the copied data into a data voltage and supply the data voltage to data lines of a display panel, and sequentially supplying a gate pulse to gate lines of the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
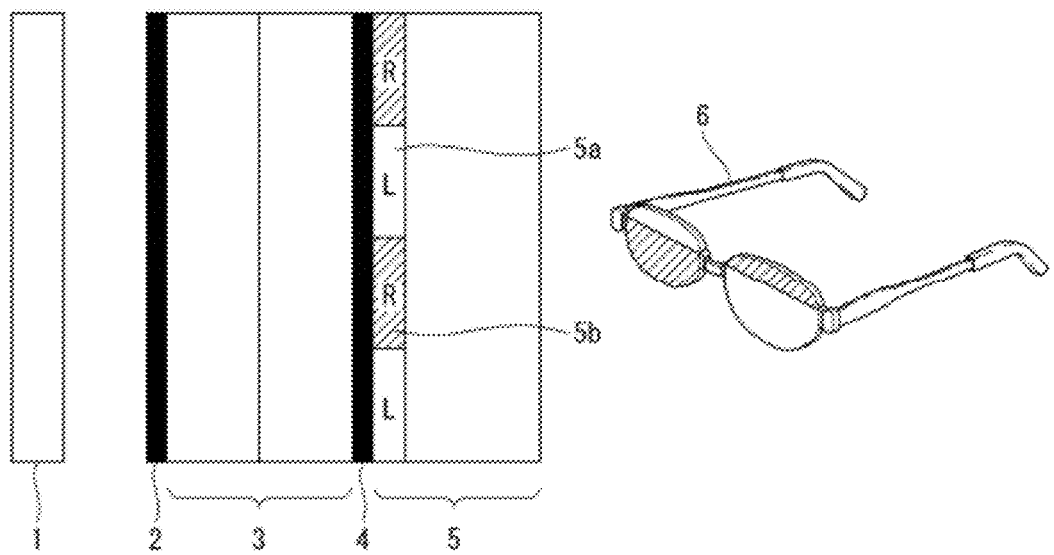
FIG. 1 illustrates a related art glasses type stereoscopic image display.
Figure 2:
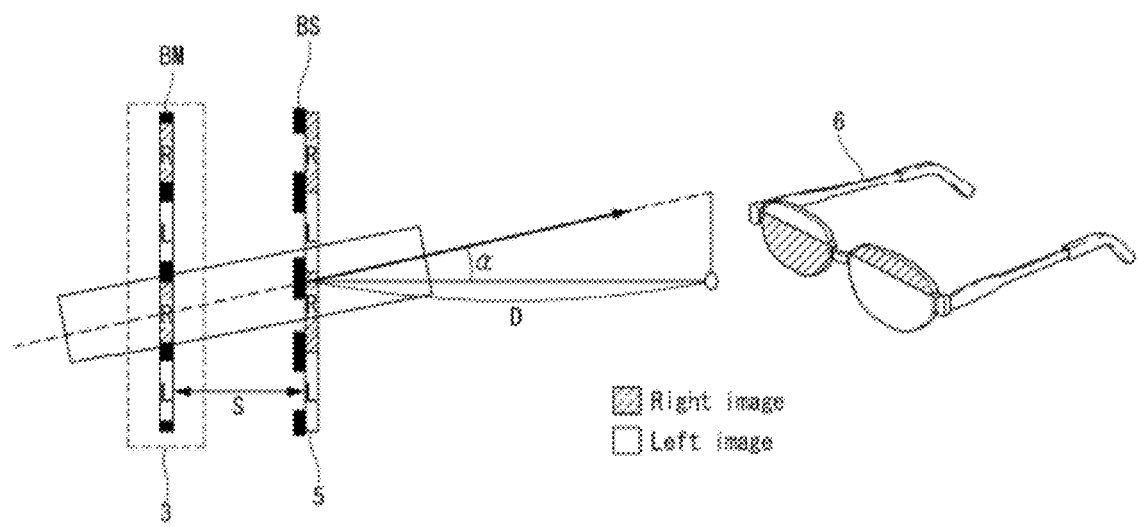
FIG. 2 illustrates a related art stereoscopic image display including black stripes formed on a patterned retarder.
Figure 3:
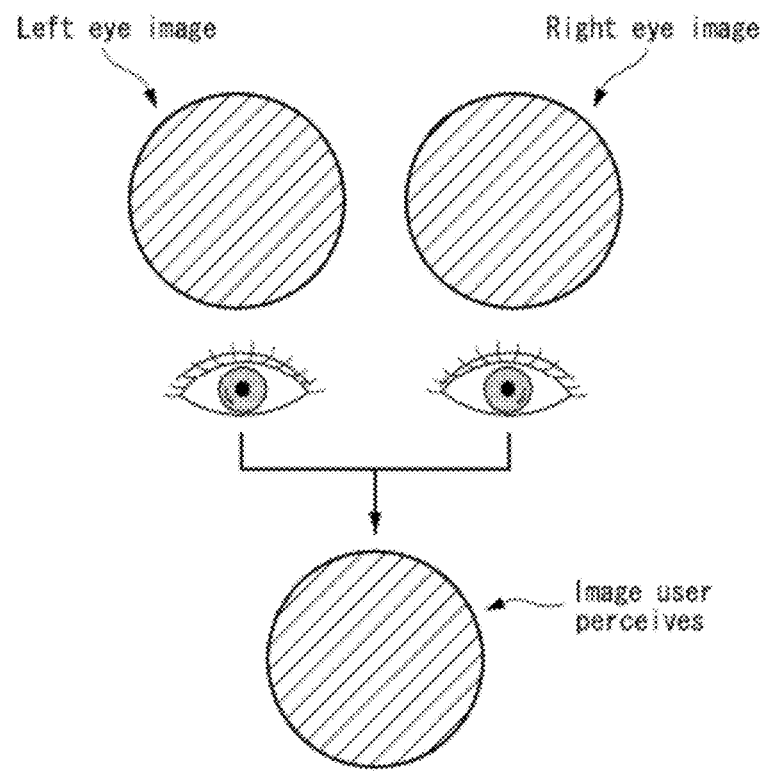
FIG. 3 illustrates a binocular fusion phenomenon.
Figure 4:
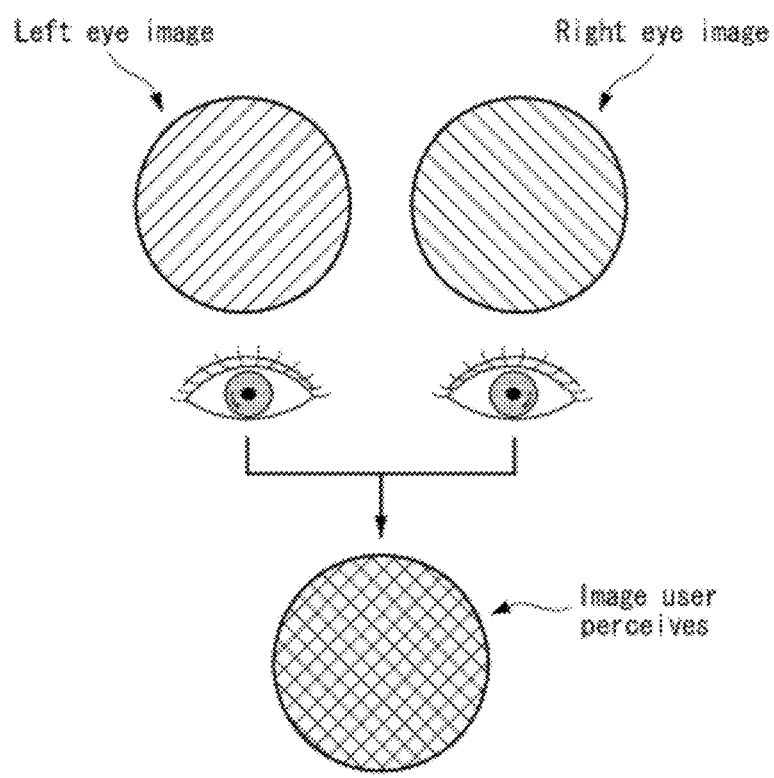
FIG. 4 illustrates a binocular rivalry phenomenon.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Figure 5:
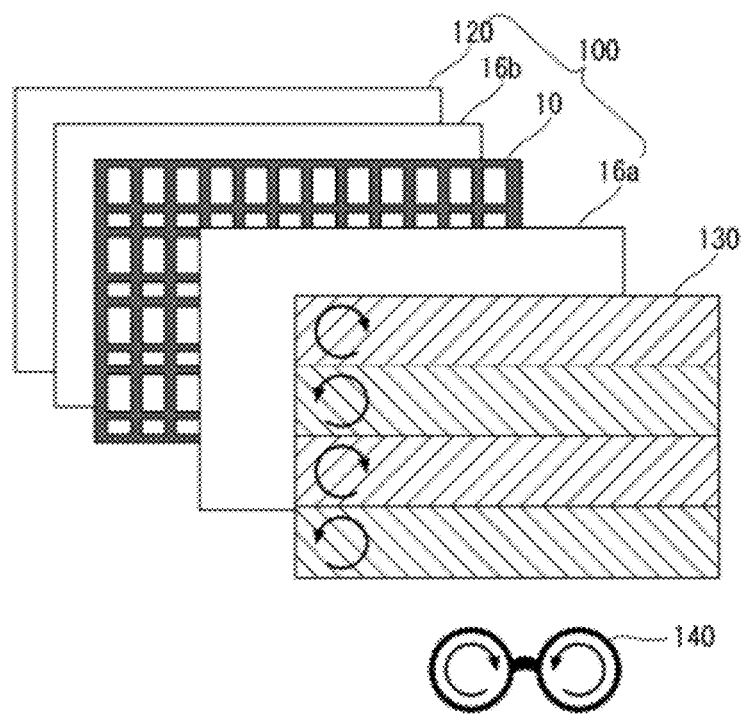
FIG. 5 is an exploded perspective view illustrating a display panel, a patterned retarder, and polarization glasses of a stereoscopic image display according to an example embodiment of the invention.
Figure 6:
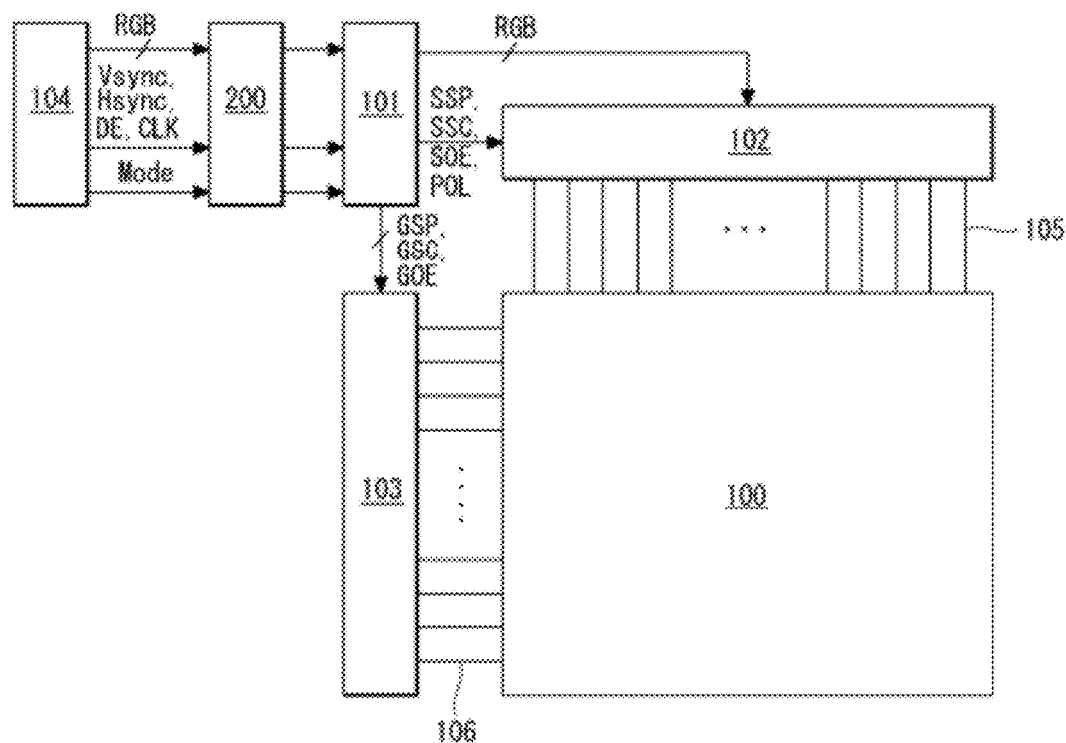
FIG. 6 is a black diagram illustrating driving circuits of a display panel shown in FIG. 5.
Figure 7:
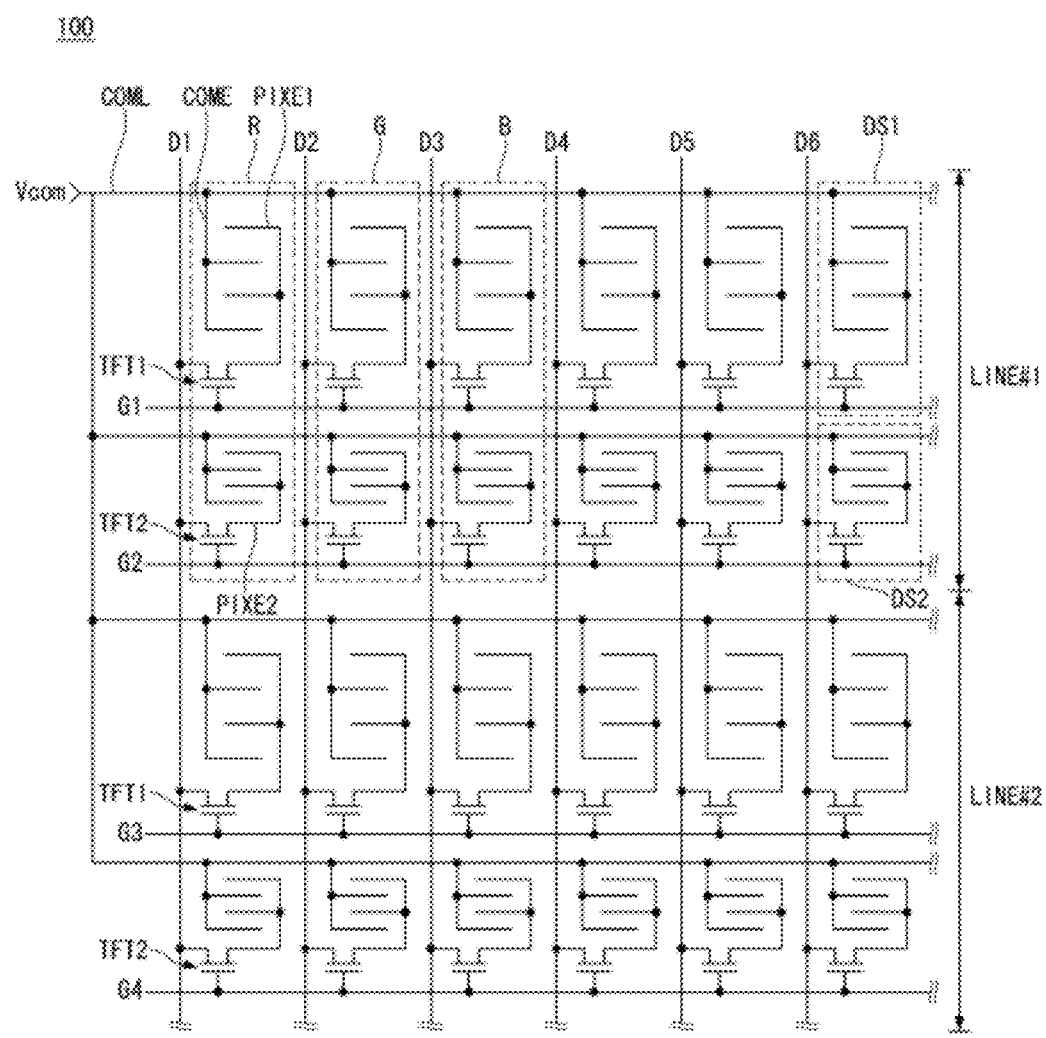
FIG. 7 is a circuit diagram illustrating a portion of a thin film transistor (TFT) array of a display panel shown in FIG. 6.

FIGS. 5 to 7 illustrate a stereoscopic image display according to an example embodiment of the invention.

As shown in FIGS. 5 to 7, the stereoscopic image display according to the example embodiment of the invention includes a display panel 100, a patterned retarder 130, polarization glasses 140, driving circuits 101 to 104 and 200 of the display panel 100, and the like.

The display panel 100 displays 2D image data and 3D image data. The display panel 100 may be implemented as a display panel of a flat panel display such as a liquid crystal display (LCD), a field emission display (FED), a plasma display panel (PDP), an electroluminescence device (EL) including an inorganic electroluminescence element and an organic light emitting diode (OLED) element, and an electrophoretic display (EPD). Polarizing films and a backlight unit are necessary in a self-emitting display element. Hereinafter, the display panel 100 is described using a display panel of the liquid crystal display as an example. Other kinds of display panels may be used.

The display panel 100 includes an upper glass substrate, a lower glass substrate, and a liquid crystal layer between the upper and lower glass substrates. The display panel 100 includes pixels arranged in a matrix form based on a crossing structure of data lines 105 and D1-D6 and gate lines 106 and G1-G4. A thin film transistor (TFT) array shown in FIG. 7 is formed on the lower glass substrate of the display panel 100. The TFT array includes the data lines 105 and D1-D6, the gate lines 106 and G1-G4, thin film transistors, storage capacitors (not shown), and the like. Liquid crystals of the pixels are driven by an electric field between pixel electrodes connected to the TFTs and common electrodes. A color filter array is formed on the upper glass substrate of the display panel 100. The color filter array includes black matrixes, color filters, common electrodes, and the like. Polarizing films 16a and 16b are respectively attached to the upper glass substrate and the lower glass substrate. Alignment layers for setting a pre-tilt angle of the liquid crystals are respectively formed on the upper glass substrate and the lower glass substrate.

The common electrodes are formed on the upper glass substrate in a vertical electric field driving manner such as a twisted nematic (TN) mode and a vertical alignment (VA) mode. In a horizontal electric field driving manner such as an in-plane switching (IPS) mode and a fringe field switching (FFS) mode, the common electrodes are formed on the lower glass substrate along with the pixel electrodes. A column spacer may be formed between the upper and lower glass substrates to keep a cell gap of the liquid crystal layer constant.

The display panel 100 may be implemented in any liquid crystal mode as well as the TN, VA, IPS, and FFS modes. The liquid crystal display according to the embodiment of the invention may be implemented as any type liquid crystal display including a backlit liquid crystal display, a transflective liquid crystal display, and a reflective liquid crystal display. A backlight unit 120 is necessary in the backlit liquid crystal display and the transflective liquid crystal display. The backlight unit 120 may be implemented as a direct type backlight unit or an edge type backlight unit.

In a 2D mode, a 2D image is displayed on odd-numbered display lines LINE#1 and even-numbered display lines LINE#2 of the display panel 100. In a 3D mode, a left eye image (or a right eye image) is displayed on the odd-numbered display lines LINE#1, and the right eye image (or the left eye image) is displayed on the even-numbered display lines LINE#2.

The patterned retarder 130 is attached to the upper polarizing film 16a of the display panel 100 and is positioned opposite the screen of the display panel 100. The patterned retarder 130 includes first retarders formed on odd-numbered lines of the patterned retarder 130 and second retarders formed on even-numbered lines of the patterned retarder 130. A light absorption axis of the first retarder is different from a light absorption axis of the second retarder. The first retarders of the patterned retarder 130 are positioned opposite the odd-numbered display lines LINE#1 of the display panel 100. Thus, the first retarders convert light incident from the odd-numbered display lines LINE#1 into first polarized light (for example, circularly polarized light or linearly polarized light) and transmit the first polarized light. The second retarders of the patterned retarder 130 are positioned opposite the even-numbered display lines LINE#2 of the display panel 100. Thus, the second retarders convert light incident from the even-numbered display lines LINE#2 into second polarized light (for example, circularly polarized light or linearly polarized light) and transmit the second polarized light. For this, the first retarders may be implemented as a polarizing filter passing through only left-circularly polarized light, and the second retarders may be implemented as a polarizing filter passing through only right-circularly polarized light.

The patterned retarder 130 does not have to include a separate black stripe. As shown in FIG. 7, this is because each of the pixels of the display panel 100 is spatially divided into two parts and one of the two parts serves as an active black stripe.

Figure 10:
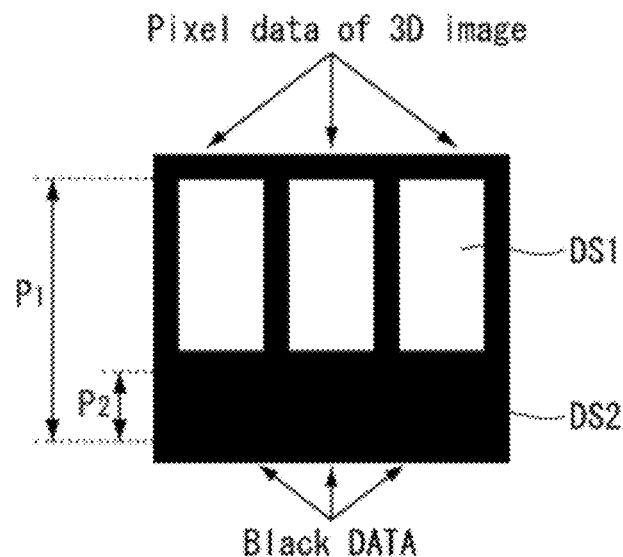
FIG. 10 illustrates an example of writing black data to a second division subpixel.
Figure 11:
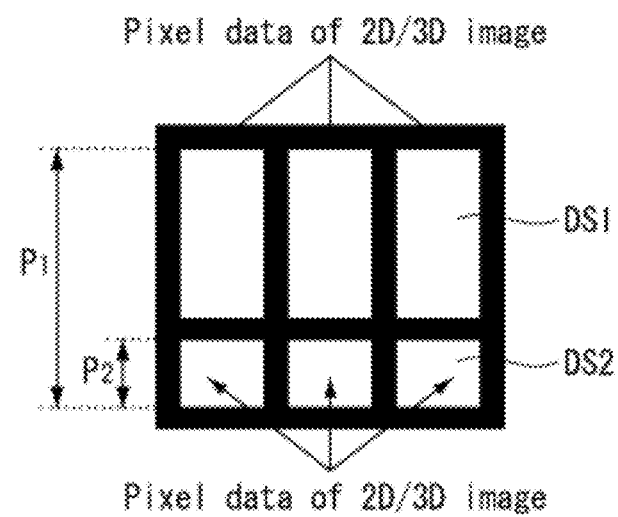
FIG. 11 illustrates an example of writing 2D/3D image data to a second division subpixel.

As shown in FIG. 7, each of the pixels of the display panel 100 includes a red subpixel R, a green subpixel G, and a blue subpixel B. Each of the red, green, and blue subpixels is divided into a first division subpixel DS1 and a second division subpixel DS2. The first division subpixel DS1 includes a first division pixel electrode PIXE1 and a first TFT TFT1. The first division subpixels DS1 displays a data voltage of the 2D or 3D image as shown in FIGS. 10 and 11. The first TFT TFT1 supplies the data voltage from the data lines D1-D6 to the first division pixel electrode PIXE1 in response to the gate pulse from the odd-numbered gate lines G1 and G3. In the first TFT TFT1, for example, the first TFT TFT1 of the first red subpixel R on the first display line LINE#1 shown in FIG. 7, a gate electrode is connected to the first gate line G1, a drain electrode is connected to the first data line D1, and a source electrode is connected to the first division pixel electrode PIXE1 The second division subpixel DS2 includes a second division pixel electrode PIXE2 and a second TFT TFT2. As shown in FIGS. 10 and 11, the second division subpixel DS2 displays the data voltage of the 2D/3D image and selectively displays a black gray level voltage. Thus, the second division subpixels DS2 operate as the active black stripes. The second TFT TFT2 supplies the data voltage from the data lines D1-D6 to the second division pixel electrode PIXE2 in response to the gate pulse from the even-numbered gate lines G2 and G4. In the second TFT TFT2, for example, the second TFT TFT2 of the first red subpixel R on the first display line LINE#1 shown in FIG. 7, a gate electrode is connected to the second gate line G2, a drain electrode is connected to the first data line D1, and a source electrode is connected to the second division pixel electrode PIXE2. Each of the first and second division subpixels DS1 and DS2 includes a storage capacitor. In the IPS mode, the TFT array includes common electrodes COME for forming a horizontal electric field along with the first and second division pixel electrodes PIXE1 and PIXE2. The common electrodes COME are connected to a common line COML connected to all of the pixels. A common voltage Vcom is supplied to the common electrodes COME through the common line COML.

A left eye polarizing filter of the polarization glasses 140 has the same light absorption axis as the first retarders of the patterned retarder 130, and a right eye polarizing filter of the polarization glasses 140 has the same light absorption axis as the second retarders of the patterned retarder 130. For example, a left circular polarizing filter may be selected as the left eye polarizing filter of the polarization glasses 140, and a right circular polarizing filter may be selected as the right eye polarizing filter of the polarization glasses 140. Thus, the user views the 3D image using the polarization glasses 140 and views the 2D image without wearing the polarization glasses 140.

The driving circuits 101 to 104 and 200 of the display panel 100 include a data driving circuit 102, a gate driving circuit 103, a timing controller 101, a system board 104, an active black stripe controller 200, and the like.

The data driving circuit 102 latches digital video data RGB under the control of the timing controller 101. The data driving circuit 102 converts the digital video data RGB into positive and negative analog gamma compensation voltages in response to a polarity control signal POL, thereby inverting a polarity of the data voltage. The data driving circuit 102 inverts polarities of the data voltages output to the data lines 105 and D1-D6 in response to the polarity control signal POL.

Figure 13:
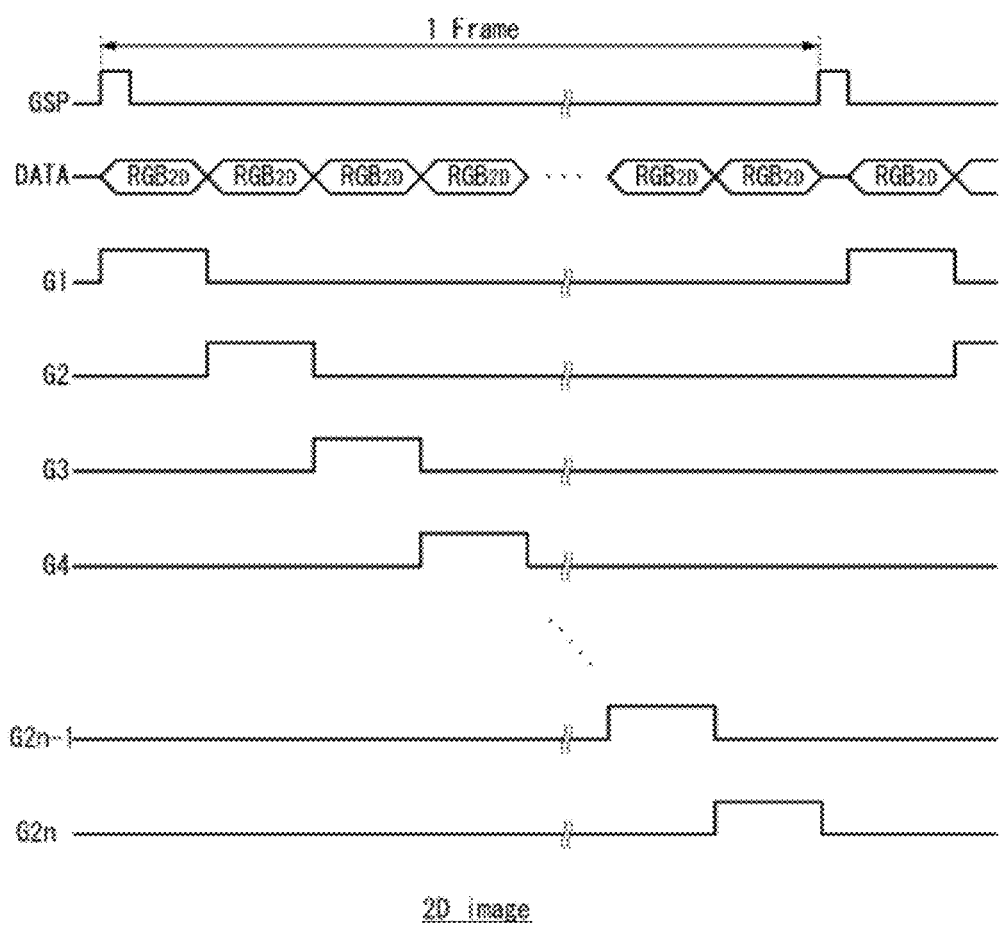
FIG. 13 is a waveform diagram illustrating 2D image data supplied to data lines and a gate pulse supplied to gate lines in a 2D mode.

As shown in FIGS. 11 and 13, in the 2D mode, the data driving circuit 102 converts digital video data $RGB_2D$ of the 2D image into the positive and negative data voltages and outputs the data voltages of the 2D image to the data lines 105 and D1-D6 in each horizontal period.

In the 3D mode, the data driving circuit 102 converts digital video data $RGB_L$ of the left eye image and digital video data $RGB_R$ of the right eye image into the positive and negative data voltages and outputs the positive and negative data voltages to the data lines 105 and D1-D6. The data driving circuit 102 allows a data output of a non-stereoscopic image portion of the 3D image to be different from a data output of an image portion excluding the non-stereoscopic image portion from the 3D image using data rearranged by the active black stripe controller 200.

Figure 9:
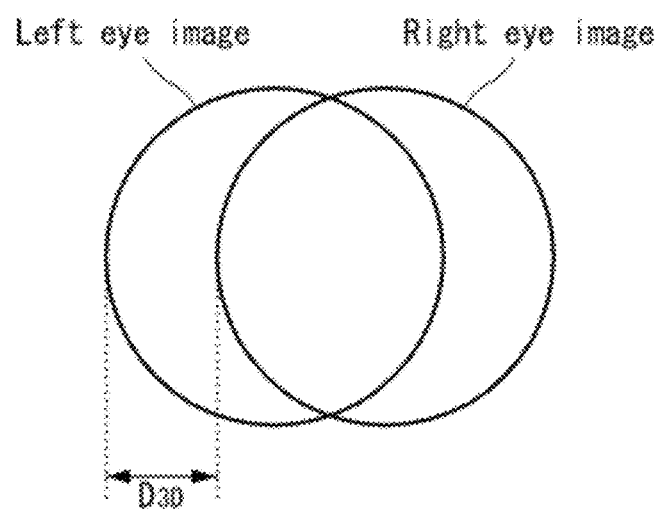
FIG. 9 illustrates a method for detecting a 3D depth.
Figure 12:
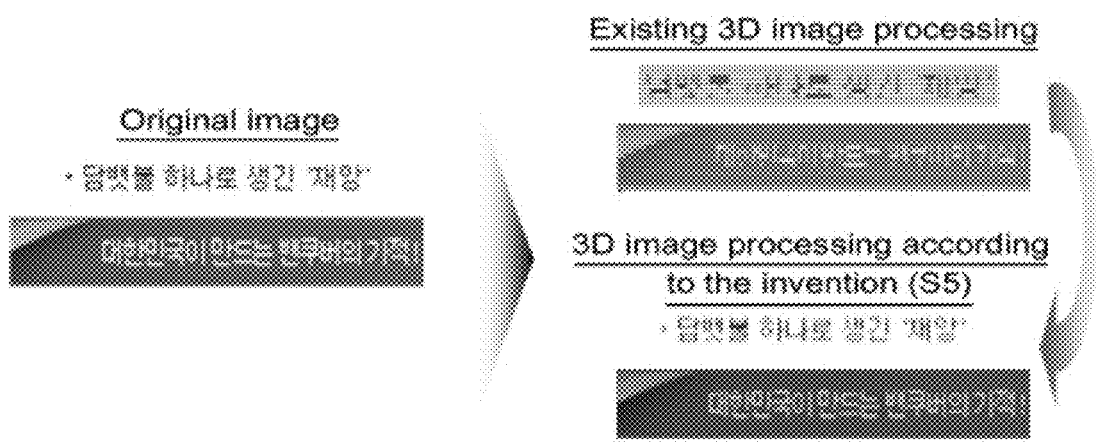
FIG. 12 illustrates the result of an experiment for comparing a related art with an example embodiment of the invention when a non-stereoscopic image portion is displayed on a stereoscopic image display in a 3D mode.
Figure 14:
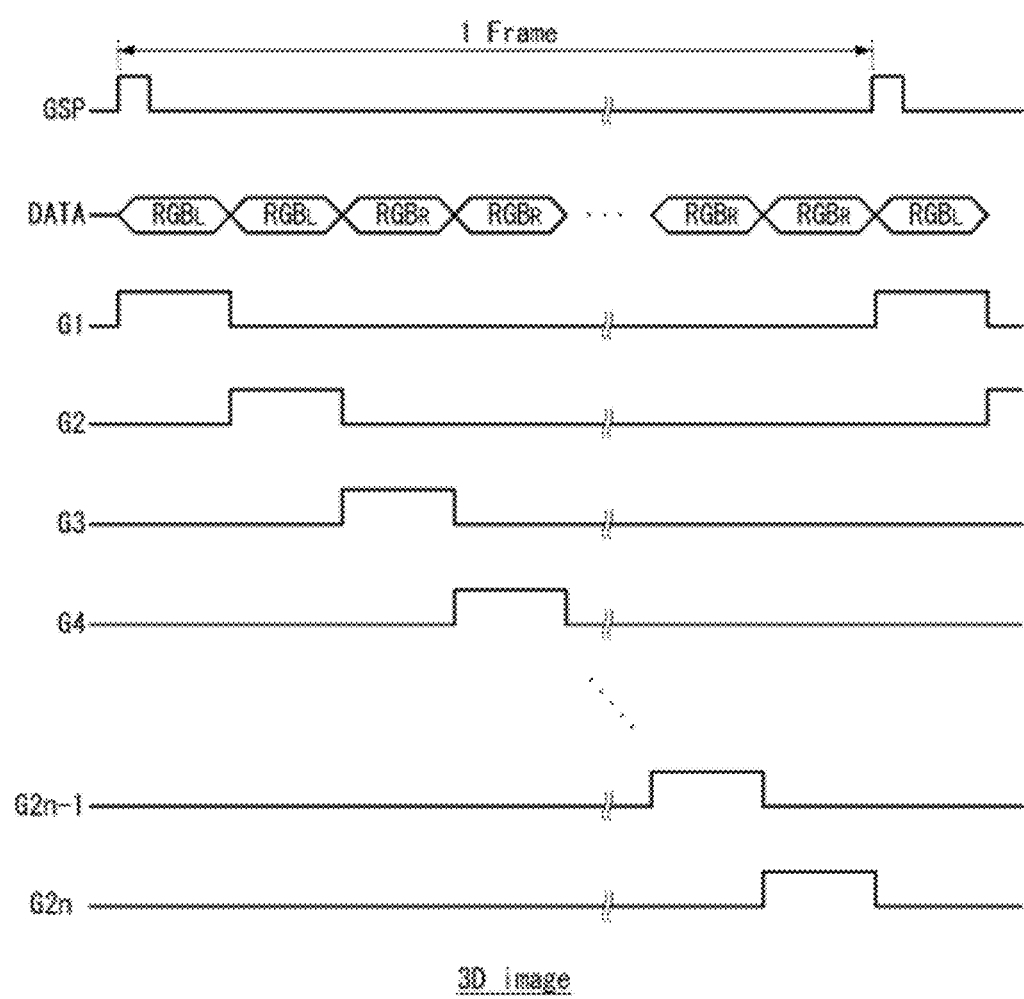
FIG. 14 is a waveform diagram illustrating non-stereoscopic image data supplied to data lines and a gate pulse supplied to gate lines in a 3D mode.

More specifically, as shown in FIGS. 11 and 14, in the 3D mode, the data driving circuit 102 converts digital video data RGBL and RGBR of left and right eye images of the non-stereoscopic image portion of the 3D image into the positive and negative data voltages. The data driving circuit 102 outputs the data voltage of the left eye image (or the right eye image) of the non-stereoscopic image portion to the data lines 105 and D1-D6 during (4k+1)th horizontal periods and (4k+2)th horizontal periods, where k is a positive integer. The data driving circuit 102 then outputs the data voltage of the right eye image (or the left eye image) of the non-stereoscopic image portion to the data lines 105 and D1-D6 during (4k+3)th horizontal periods and (4k+4)th horizontal periods. In the embodiment of the invention, as shown in FIG. 12, the non-stereoscopic image portion of the 3D image indicates an image having a high spatial frequency, in which a 3D depth between the left and right eye images of the non-stereoscopic image portion is equal to or less than a predetermined threshold value. In the following description, the image portion excluding the non-stereoscopic image portion from the 3D image is represented as a stereoscopic image portion. As shown in FIG. 9, the 3D depth may be calculated by a distance between edges of left and right eye images of the same object. The predetermined threshold value may be experimentally determined as a 3D depth between left and right eye images which do not cause a binocular rivalry phenomenon.

Figure 15:
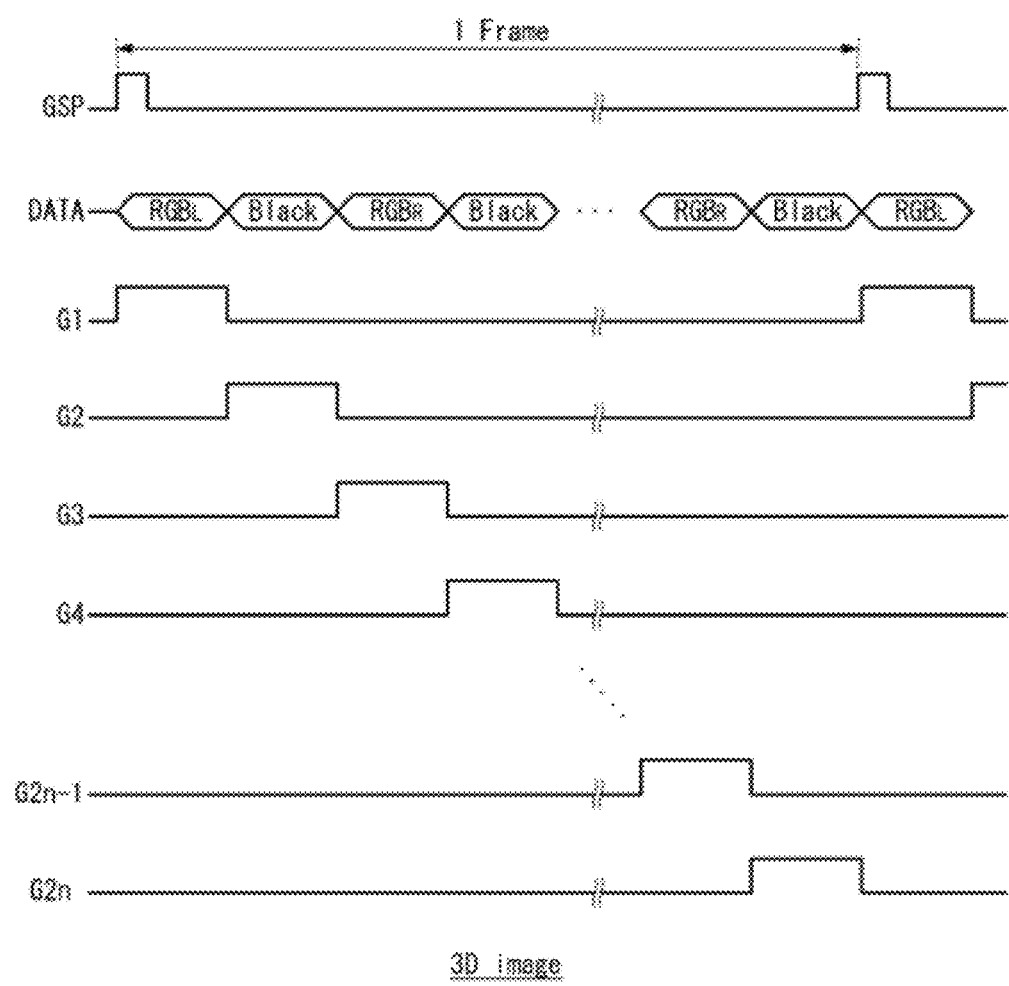
FIG. 15 is a waveform diagram illustrating stereoscopic image data supplied to data lines and a gate pulse supplied to gate lines in a 3D mode.

As shown in FIGS. 10 and 15, in the 3D mode, the data driving circuit 102 converts digital video data RGBL and RGBR of left and right eye images of the stereoscopic image portion of the 3D image and digital data (hereinafter referred to as "black data") of a black gray level into the positive and negative data voltages. The data driving circuit 102 outputs the data voltage of the left eye image (or the right eye image) of the stereoscopic image portion to the data lines 105 and D1-D6 during the (4k+1)th horizontal periods and then outputs the black gray level voltage to the data lines 105 and D1-D6 during the (4k+2)th horizontal periods. Subsequently, the data driving circuit 102 outputs the data voltage of the right eye image (or the left eye image) of the stereoscopic image portion to the data lines 105 and D1-D6 during the (4k+3)th horizontal periods and then outputs the black gray level voltage to the data lines 105 and D1-D6 during the (4k+4)th horizontal periods. The black data is data of the black gray level stored in a built-in register of the active black stripe controller 200 irrespective of an image input to the stereoscopic image display. As shown in FIG. 15, the black data is inserted between the digital video data $RGB_L$ of the left eye image and the digital video data $RGB_R$ of the right eye image by the active black stripe controller 200.

The gate driving circuit 103 sequentially supplies the gate pulses to the gate lines 106 and G1-G4 under the control of the timing controller 101. The gate pulses are synchronized with the data voltages of the 2D image in the 2D mode. In the 3D mode, odd-numbered gate pulses and even-numbered gate pulses among gate pulses for scanning the non-stereoscopic image portion are synchronized with the data voltages of the left or right eye image of the non-stereoscopic image portion. On the other hand, in the 3D mode, odd-numbered gate pulses among gate pulses for scanning the stereoscopic image portion are synchronized with the data voltages of the left or right eye image of the stereoscopic image portion, and even-numbered gate pulses are synchronized with the black gray level voltage.

The timing controller 101 rearranges the digital video data RGB input through the system board 104 and the active black stripe controller 200 and transfers the rearranged digital video data RGB to the data driving circuit 102. The timing controller 101 receives timing signals, such as a vertical sync signal Vsync, a horizontal sync signal Hsync, a data enable DE, and a dot clock CLK, from the system board 104 via the active black stripe controller 200. The timing controller 101 generates a gate timing control signal for controlling operation timing of the gate driving circuit 103 and a data timing control signal for controlling operation timing of the data driving circuit 102 and a polarity of the data voltage based on the timing signals. The timing controller 101 receives a mode signal MODE from the system board 104 through the active black stripe controller 200 and may decide the 2D mode or the 3D mode.

The gate timing control signal includes a gate start pulse GSP, a gate shift clock GSC, a gate output enable GOE, and the like. The gate start pulse GSP is applied to a first gate driver integrated circuit (IC) of the gate driving circuit 103 generating a first gate pulse. The gate shift clock GSC is commonly input to the plurality of gate driver ICs of the gate driving circuit 103 and also shifts the gate start pulse GSP. The gate output enable GOE controls outputs of the gate driver ICs.

The data timing control signal includes a source start pulse SSP, a source sampling clock SSC, a polarity control signal POL, a source output enable SOE, and the like. The source start pulse SSP controls a data sampling start timing of the data driving circuit 102. The source sampling clock SSC controls a sampling timing of data inside the data driving circuit 102 based on a rising or falling edge thereof. The polarity control signal POL controls a polarity of the data voltage output from the data driving circuit 102. The source output enable SOE controls an output timing of the data driving circuit 102. If the digital video data RGB to be input to the data driving circuit 102 is transferred based on a mini low voltage differential signaling (LVDS) interface standard, the source start pulse SSP and the source sampling clock SSC may be omitted.

The system board 104 supplies the digital video data RGB of the 2D or 3D image and the timing signals Vsync, Hsync, DE and CLK to the active black stripe controller 200 through an interface, such as an LVDS interface and a transition minimized differential signaling (TMDS) interface. The system board 104 supplies the mode signal MODE indicating the 2D mode and the 3D mode to the timing controller 101 and the gate driving circuit 103. The system board 104 supplies the digital video data $RGB_{2D}$ of the 2D image to the timing controller 101 in the 2D mode. On the other hand, in the 3D mode, the system board 104 supplies the digital video data $RGB_L$ and $RGB_R$ of the 3D image including the left eye image and the right eye image to the timing controller 101. The system board 104 may transfer the digital video data $RGB_{2D}$ of the 2D image at a frame frequency of (60×N) Hz, where N is a positive integer equal to or greater than 2.

An operation of the active black stripe controller 200 is described with reference to FIG. 8.

Figure 8:
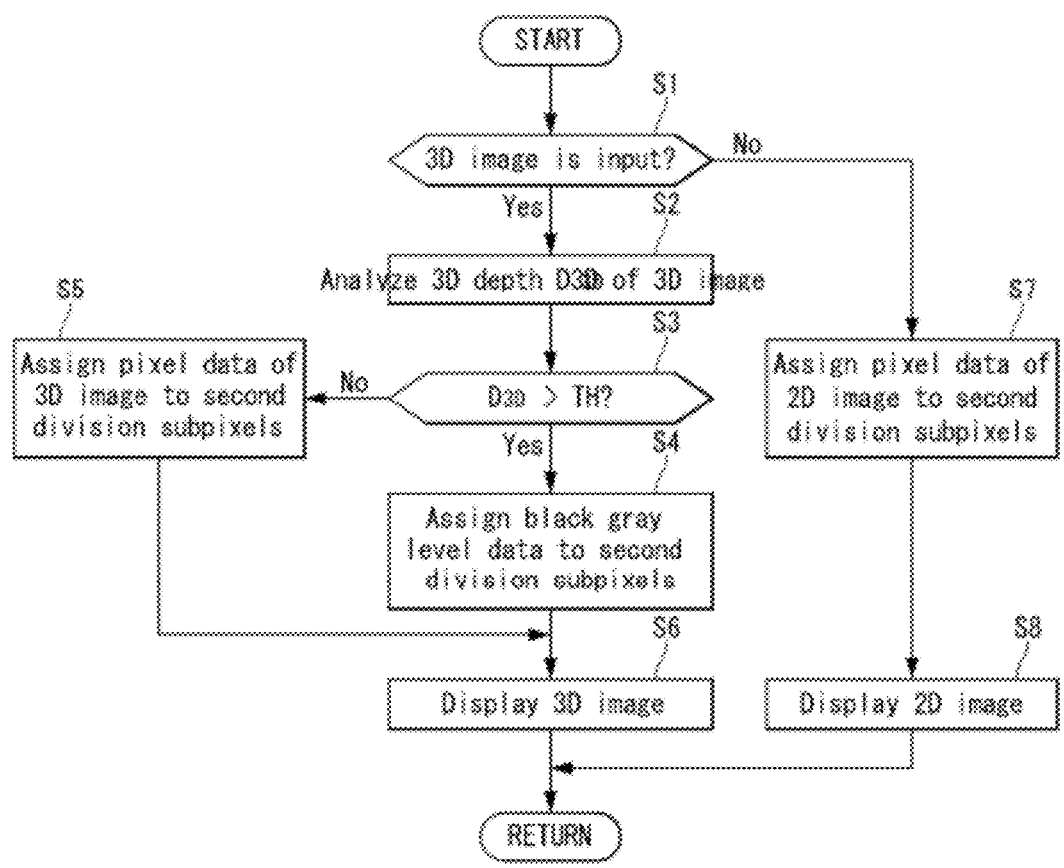
FIG. 8 is a flow chart illustrating data processing of an active black stripe controller shown in FIG. 6.

As shown in FIG. 8, when the data $RGB_L$ and $RGB_R$ of the 3D image are input in step S1, the active black stripe controller 200 extracts an edge of the left eye image data $RGB_L$ and an edge of the right eye image data $RGB_R$ using an edge detection filter and compares a distance between the edges with a previously determined depth mapping table. Hence, the active black stripe controller 200 analyzes a 3D depth $D_3D$ in step S2. Any known method may be used to analyze the 3D depth $D_3D$. When the 3D depth $D_3D$ obtained by the 3D depth analysis method is equal to or less than a predetermined threshold value TH in step S3, the active black stripe controller 200 decides that the 3D image includes the non-stereoscopic image portion. Thus, the active black stripe controller 200 obtains pixel data copied from the left eye image data RGBL and the right eye image data RGBR of the non-stereoscopic image portion and supplies the copied pixel data to the timing controller 101 in step S5. The 3D image is displayed on the display panel 100 in step S6. As shown on FIG. 14, the copied left and right eye image data is inserted at a location to be written to the second division subpixels DS2. More specifically, the copied left eye image data is written to the second division subpixel DS2 of the pixel, to which the left eye image data will be written, and the copied right eye image data is written to the second division subpixel DS2 of the pixel, to which the right eye image data will be written. When the 3D depth D3D is greater than the predetermined threshold value TH in step S3, the active black stripe controller 200 decides the 3D image as the stereoscopic image not causing the binocular rivalry phenomenon. The active black stripe controller 200 assigns the black data to the stereoscopic image and supplies the stereoscopic image data and the black data to the timing controller 101 in steps S4 and S6. As shown in FIG. 15, the black data is inserted at a location to be written to the second division subpixels DS2. When the 2D image data RGB2D is input, as shown in FIG. 13, the active black stripe controller 200 assigns data copied from the 2D image data RGB2D as data to be written to the second division subpixel DS2 and supplies the copied 2D image data to the timing controller 101, in step S7. The 2D image is displayed on the display panel 100 in step S8. The active black stripe controller 200 may be built in the timing controller 101.

As described above, the stereoscopic image display according to the embodiment of the invention divides each of the subpixels into the first and second division subpixels and operates one of the first and second division subpixels as the active black stripe, thereby increasing the display quality of the 2D image and the display quality of the 3D image. Furthermore, the stereoscopic image display according to the embodiment of the invention decides the non-stereoscopic image portion of the 3D image based on the result of the analysis of the 3D depth in the 3D mode and assigns the 3D image data as data to be written to the second division subpixels of the non-stereoscopic image portion. As a result, the stereoscopic image display according to the embodiment of the invention may minimize the artifact generated in the related art and increase the display quality of the 3D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display, comprising:
   a display panel, comprising:
      data lines;
      gate lines crossing the data lines;
      thin film transistors (TFTs) respectively formed at crossings of the data lines and the gate lines; and
      pixels, each of which is divided into first and second division subpixels;
   an active black stripe controller configured to:
      analyze an information of a 3D depth value between left eye image data and right eye image data;
      compare the 3D depth value with a predetermined threshold value; and
      assign data copied from the left eye image data and the right eye image data as data to be written to the second division subpixels when the 3D depth value is equal to or less than the predetermined threshold value;
   a data driving circuit configured to:
      convert digital data received from the active black stripe controller into a data voltage; and
      supply the data voltage to the data lines; and
   a gate driving circuit configured to sequentially supply a gate pulse to the gate lines.

2. The stereoscopic image display of claim 1, wherein, when the 3D depth value is greater than the predetermined threshold value, the active black stripe controller assigns digital data of a black gray level as data to be written to the second division subpixels.

3. The stereoscopic image display of claim 2, further comprising a timing controller configured to:
   control an operation timing of the data driving circuit and an operation timing of the gate driving circuit; and transfer the digital data received from the active black stripe controller to the data driving circuit.

4. The stereoscopic image display of claim 3, wherein the active black stripe controller is provided in the timing controller.

5. The stereoscopic image display of claim 1, wherein the display panel is a display panel of one of a liquid crystal display (LCD), a field emission display (FED), a plasma display panel (PDP), an electroluminescence device (EL) including an inorganic electroluminescence element and an organic light emitting diode (OLED) element, and an electrophoretic display (EPD).

6. The stereoscopic image display of claim 1, further comprising:
   a patterned retarder positioned opposite a screen of the display panel, the patterned retarder configured to convert a polarization characteristic of light incident from the screen of the display panel; and
   polarization glasses including a left eye polarizing filter and a right eye polarizing filter each having a different polarization characteristic.

7. A method for driving a stereoscopic image display, the method comprising:
   analyzing an information of a 3D depth value between left eye image data and right eye image data;
   comparing the 3D depth value with a predetermined threshold value;
   assigning data copied from the left eye image data and the right eye image data as data to be written to second division subpixels of pixels when the 3D depth value is equal to or less than the predetermined threshold value;
   converting the left eye image data, the right eye image, and the copied data into a data voltage;
   supplying the data voltage to data lines of a display panel; and
   sequentially supplying a gate pulse to gate lines of the display panel.

8. The method of claim 7, further comprising, when the 3D depth value is greater than the predetermined threshold value, assigning digital data of a black gray level as data to be written to the second division subpixels.

9. The method of claim 8, further comprising:
   converting the digital data of the black gray level into the data voltage; and
   supplying the data voltage to the data lines of the display panel.

* * * * *